United States Patent [19]
Srisathapat

[11] Patent Number: 4,821,929
[45] Date of Patent: Apr. 18, 1989

[54] DISPENSER
[76] Inventor: Chalirmkiert Srisathapat, 8701 Vine Valley Dr., Sun Valley, Calif. 91352
[21] Appl. No.: 157,556
[22] Filed: Feb. 19, 1988
[51] Int. Cl.$^4$ ............................................. G01F 11/10
[52] U.S. Cl. .................................... 222/367; 222/452
[58] Field of Search ............... 222/368, 367, 452, 450, 222/444, 169, 170, 172; 221/277, 263

[56] References Cited
U.S. PATENT DOCUMENTS 245,528  8/1881  Marchand .......................... 222/452
910,246  1/1909  Travis ................................ 222/368
2,109,795  3/1938  Hall .................................. 222/368

FOREIGN PATENT DOCUMENTS 123889  1/1928  Switzerland ........................ 222/368

Primary Examiner—Joseph J. Rolla
Assistant Examiner—Kenneth Noland
Attorney, Agent, or Firm—Henderson & Sturm

[57] ABSTRACT

The dispenser features a container in which a rotary valve operates to dispense quantities of material periodically. The valve rotates on a horizontal axis above the bottom of the dispenser container so that it is at least partly immersed in the material and, during rotation, scoops up material and retains it in one or more pockets until at a preselected angular position of the valve, an opening therein registers with an opening in the front wall of the container to discharge material. The valve has generally the shape of a truncated section of a cone and the sloping walls of the truncated-conical rim cooperate with radial walls to define one or more pockets or cavities for containing material prior to discharge.

2 Claims, 2 Drawing Sheets

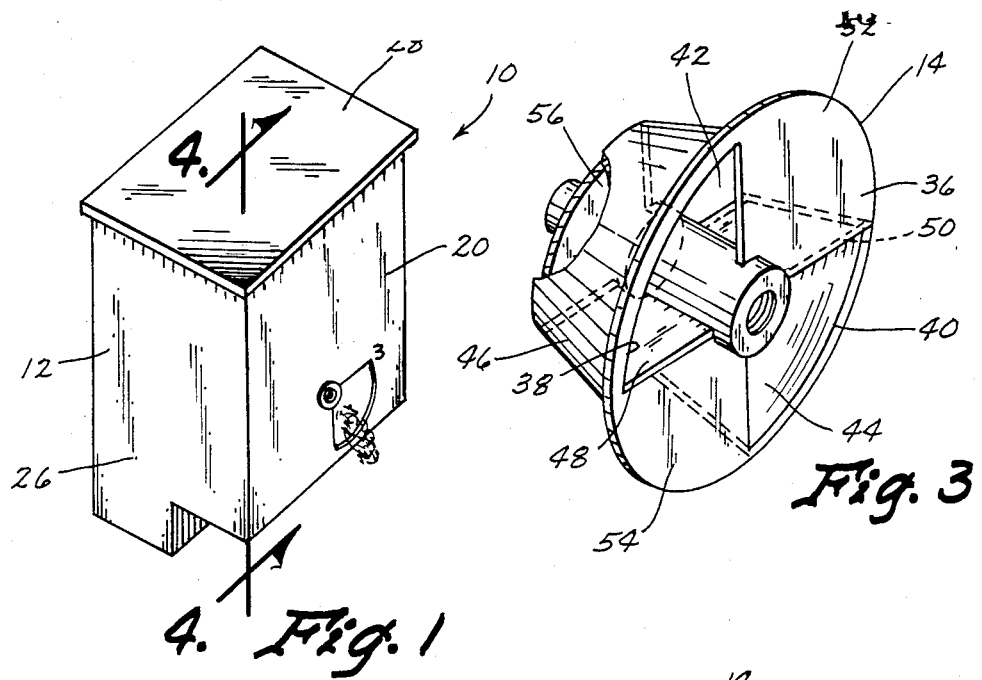
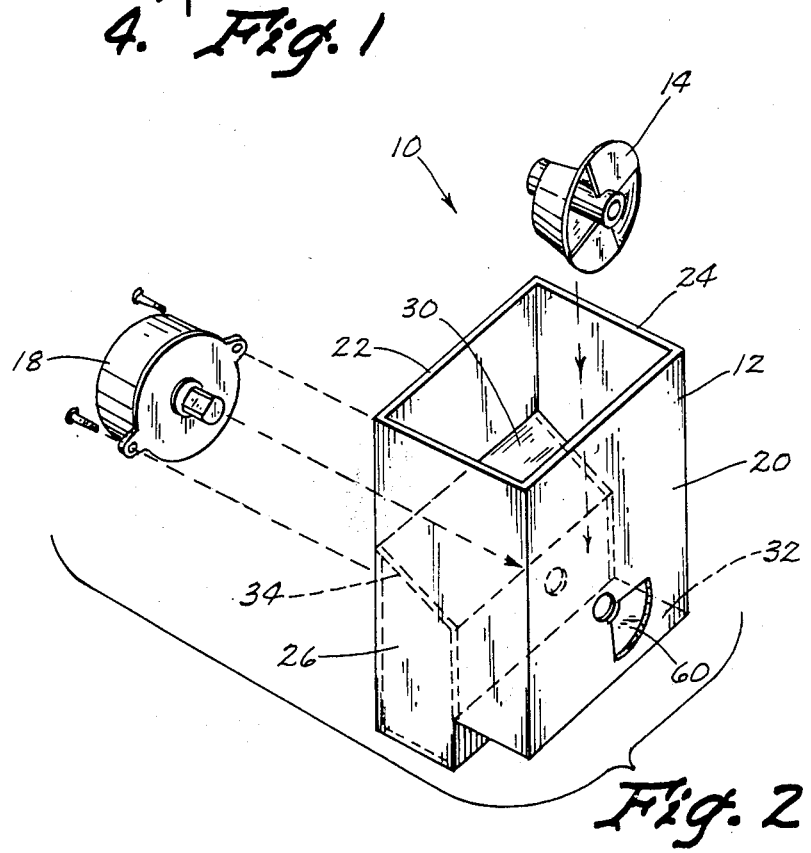

DISPENSER

BACKGROUND AND SUMMARY OF THE INVENTION

The prior art is of course replete with various types of dispensers operative to periodically discharge measured quantities of material, as in devices for feeding animals and for other purposes. Many of these prior art devices are relatively complicated and subject to malfunctioning at times. According to the present invention, the dispenser features a rotary valve of one-piece construction, preferably molded of rigid corrosion-resistant material and presenting smooth surfaces so as to avoid unwanted accumulation of particles of material.

Further features and advantages of the invention will become apparent as a preferred embodiment of the invention is disclosed in the ensuing description and accompanying drawings.

DESCRIPTION OF THE DRAWINGS

FIG. 1 is a perspective of the assembled dispenser.

FIG. 2 is an enlarged "exploded" perspective showing the components of the dispenser.

FIG. 3 is an enlarged perspective of the rotary valve per se.

DETAILED DESCRIPTION OF THE PREFERRED EMBODIMENT OF THE INVENTION

Figure 4:
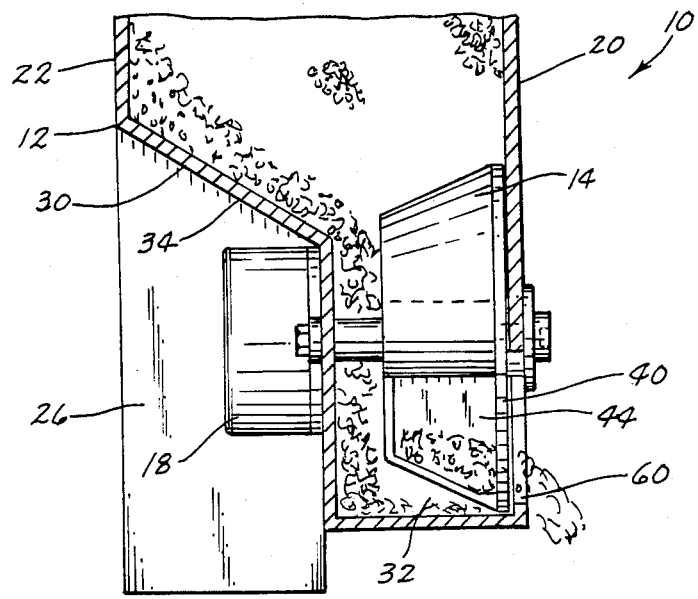
FIG. 4 is an enlarged section as seen along the line 4—4 on FIG. 1.
Figure 6:
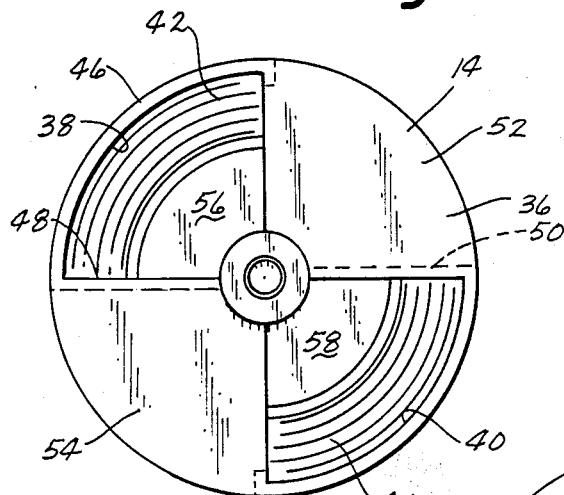
FIG. 6 is a front elevation of the valve.
Figure 5:
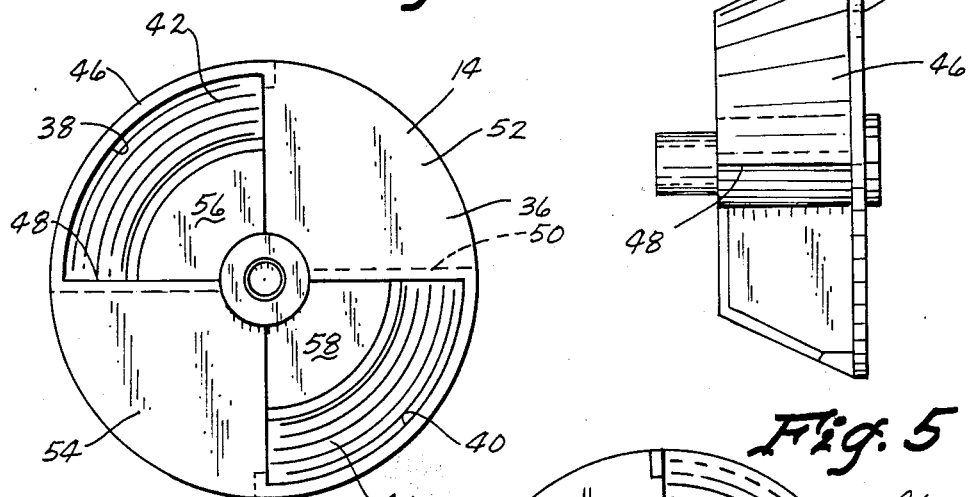
FIG. 5 is a side elevation of the valve.
Figure 7:
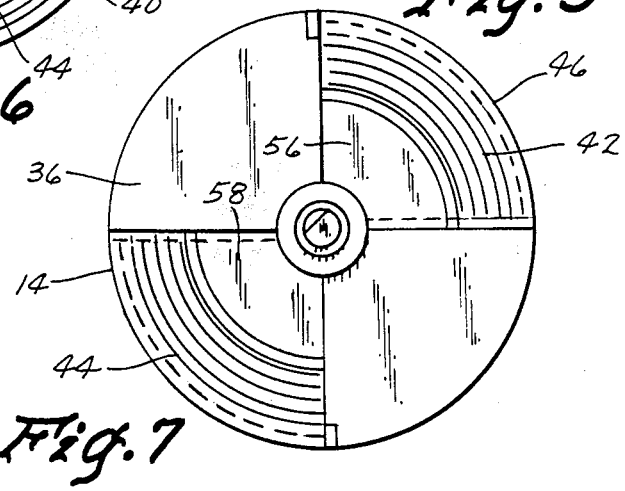
FIG. 7 is a rear elevation of the valve.

The dispenser as a whole is designated by the numeral (10) and comprises essentially two parts, a container (12) and a valve or rotor (14); although, additional parts consist of a power source such as a small electric motor (18) connected to the rotor. The container is in the form of a housing or receptacle made up of front and rear panels (20) and (22), opposite side walls (24) and (26), a top cover (28) and bottom wall structure (30). The structure (30) provides a bottom chamber (32) into which the material, being dry, granular, etc., gravitates, assisted by a sloping interior wall (34).

As best seen in FIG. 4, the rotor is journaled in the container on a horizontal axis so related vertically to the bottom of the container that the valve (14) is at least partly immersed or submerged in the material. Any form of means may be used for fixing the valve to the shaft. Likewise, resort may be had to any type of means for mounting the motor (18) exteriorly of the container, as on the rear panel as shown. These details can be varied widely without affecting the spirit and scope of the invention.

The valve (14) has generally the shape of a truncated cone having the shaft axis as its centerline or altitude. To this end, the valve has a circular front wall (36) that is interrupted at diametrically opposed areas to afford openings (38) and (40) that lead rearwardly respectively to cavities or pockets (42) and (44) defined also in part by a truncated-conical rim (46) integral with the remainder of the valve and also by radial walls (48) and (50), also integral parts of the valve. The rim is interrupted at diametrically opposed portions respectively in alinement with the imperforate portions (52) and (54) of the valve front wall (36). The valve further includes rear wall portions (56) and (58) to complete the defining of the pockets or cavities (42) and (44). With reference to the pocket (56), note FIG. 3, wherein the pocket will be seen to have a floor formed by the radial walls (48) and (50) and in part by the hub of the valve; further, the pocket has a curved roof provided by the solid or imperforate rim portion (46), and it further has the rear wall (56) and the front opening (38). The pocket opens in a clockwise direction because of the interruption of the rim. The other pocket is, of course, symmetrical.

The lower part of the front panel (20) has an outlet or window (60) adjacent the bottom part of the container chamber (32). Thus, as the valve rotates, the valve openings (38) and (40) periodically and alternately register with the window. The sloping rim portions on the valve facilitate material discharge. When the valve openings are out of register with the window, the imperforate parts (52) and (54) of the valve front wall operate to blank off the window and the imperforate parts of the front panel (20) blank off the valve openings and pockets (38) and (40). As the valve rotates clockwise, each pocket passing through the bottom chamber (32) of the container scoops up material and carries it around until that pocket opening begins to register with the front panel window (60). Since the pockets are identical and the rotation of the valve constant, the increments of material discharged will be the same. Obviously, only one pocket could be provided or several pockets, in the latter case symmetry being followed.

Features and advantages other than those pointed out herein will readily occur to those versed in the art, as will many modifications in the preferred embodiment disclosed, all without departure from the spirit and scope of the invention.

I claim:

1. A dispenser comprising: a container for containing granular or like material and having a bottom and upright front and rear panels and said front panel having a material discharge outlet, a valve disposed within the container for rotation on an axis normal to the panels and above the container bottom for at least partial immersion in the container material, said valve having a circular front wall closely behind the front panel and a rim in the form of the section of a truncated cone coaxial with the valve axis and having its base affixed to the valve front wall and tapering rearwardly to a reduced portion proximate to the rear panel, said rim being interrupted to form an opening heading to the interior of the valve and the valve further having integral therewith a radial wall cooperating with the rim opening and the aforesaid front wall of the valve to form a first pocket for receiving material from the container via said rim opening, the aforesaid front wall having an opening therein which, during part of the rotation of the valve, registers with the outlet to dispense material and during another part of said rotation is blanked off by the front panel while the valve front wall trailing the front wall opening blanks off the outlet, the valve having a second pocket identical to and spaced angularly from the first-named pocket, the valve front wall has a second wall opening like the first-named front wall opening and leading out of the second pocket.

2. The dispenser according to claim 1, in which the angular spacing between the pockets is 180° as is the angular spacing between the front wall openings.

* * * * *